United States Patent [19]

Ebert

[11] Patent Number: 5,187,543
[45] Date of Patent: Feb. 16, 1993

[54] DIFFERENTIAL DISPLACEMENT MEASURING INTERFEROMETER

[75] Inventor: Earl W. Ebert, Middletown, Conn.

[73] Assignee: Zygo Corporation, Middlefield, Conn.

[21] Appl. No.: 467,652

[22] Filed: Jan. 19, 1990

[51] Int. Cl.⁵ .............................................. G01B 9/02
[52] U.S. Cl. .................................... 356/349; 356/351
[58] Field of Search ................ 356/359, 358, 360, 354

[56] References Cited

U.S. PATENT DOCUMENTS

| | | | |
|---|---|---|---|
| 3,881,823 | 5/1975 | DeLang et al. | 356/349 |
| 4,334,778 | 8/1982 | Pardue | 356/349 |
| 4,752,133 | 6/1988 | Sommargren | 356/349 |
| 4,948,257 | 8/1990 | Kaufman | 356/354 |

Primary Examiner—Samuel A. Turner
Assistant Examiner—Richard Kurtz
Attorney, Agent, or Firm—Bryan, Cave, McPheeters & McRoberts

[57] ABSTRACT

A linear displacement interferometer system employs glass wedge prisms (71, 73, 75, 76) diposed about the interferometer axis of symmetry to refract the beams (51A, 55A) produced by the interferometer onto a single area (72, 86) approximately the size of the interferometer beam. If only one spot is produced on each of the stage and reference mirrors (72, 86), then any ambiguity concerning the beams (51B, 55B) is eliminated. In the preferred system, the stage (72) and standard (86) mirrors are located where the refracted beam crosses an interferometer axis of symmetry (80).

36 Claims, 2 Drawing Sheets

DIFFERENTIAL DISPLACEMENT MEASURING INTERFEROMETER

BACKGROUND OF THE INVENTION

1. Field of the Invention

The present invention relates to apparatus for the measurement of linear displacement. The invention, by way of example, is useful in making linear displacement measurements between two mirrored surfaces to determine the flatness of, or angle between the mirrored surfaces. More particularly, the invention relates to optical apparatus which is useful for high accuracy linear displacement metrology using interferometry.

2. The Prior Art

A standard device used in many industries is a stage which moves in two perpendicular directions, designated X and Y. XY stages are used in equipment for processing semiconductor wafers, such as step and repeat cameras. Step and repeat cameras require information on the position of an XY stage. Typical of the metrology of XY stages is to measure the position of a mirror mounted on the moving stage using displacement measuring interferometers. In such metrology systems, the stage mirrors must be at least as long as the range of travel of the stages.

A critical dimension for these stage mirrors is the flatness of the mirrored surface. Flatness errors in such stage mirrors will contribute an error to the displacement measurement and will cause a perfect servo system to follow the shape of the mirror, not a straight line as desired. It may be desirable for a user of XY stages to map the errors of a stage mirror allowing the user to compensate for the errors and/or procure mirrors with greater flatness error at reduced cost.

In order to measure the flatness of such stage mirrors based on the shape of the wavefront, prior art interferometric measuring equipment uses techniques for sensing the shape of the wavefront reflected from a mirror, such as, for example, disclosed in Malacara, D., *Optical Shop Testing*, J. Wiley and Sons. However, such prior art measuring equipment for measuring stage mirrors is costly since the size of the interferometer, which affects its cost, and which is generally large for this purpose, must be greater than the longest dimension of the stage mirror for accurate measurements. If, however, the mirrors are tested with interferometers whose aperture is smaller than the mirror's, such as by testing at large angles of incidence (typically >45°), then the sensitivity of the wavefront measuring interferometer is reduced. For example, the accuracy of prior art wavefront measuring interferometers known to applicant is limited to greater than 12 nanometers.

Other prior art systems for measuring the flatness of mirrors are disclosed in W. T. Estler, Optical Engineering, 24(3), 372-279 (May/June 1985) and U.S. Pat. No. 4,334,778. In such prior art systems, the displacement measuring interferometer outputs two parallel measurement beams to the stage mirror. A disadvantage of this prior art approach for flatness measurements is that if one beam of the interferometer were to encounter a depression in the stage mirror surface, the interferometer system would sense the depression as counts, and would be unable to unambiguously determine which beam saw the depression.

The flatness of a stage mirror is determined using the present invention by placing the interferometer on the midline between the test stage mirror and a known standard stage mirror. The stage and standard mirror are separated by a distance dictated by the interferometer design. The present invention is translated on the midline between the stage and standard mirror using some type of linear slide. When coupled with electronics appropriate for displacement measuring interferometers, the output of the system will be proportional to the sum of the flatness errors of the standard and stage mirrors. The flatness of the stage mirror is obtained when the flatness of the standard mirror and tilt between the two mirrored surfaces is subtracted from these measurements.

Since the tilt between the two mirrored surfaces that is subtracted for the flatness measurements may be of interest in some applications, the ability of the present invention to measure this parameter is useful.

The present invention overcomes the disadvantages of the prior art by using glass wedges to refract the beams produced by the interferometer onto a single area approximately the size of the interferometer beam. If only one spot is produced on each of the stage and standard mirrors, the aforementioned ambiguity concerning the two beams is eliminated. The stage and standard mirrors are located where the refracted beam crosses an interferometer axis of symmetry.

Measurements by the present invention of dimensions perpendicular to the input beam are insensitive to translation of the interferometer. This occurs because the optical path of one polarization depends only on the distance between the two interferometer reference mirrors and the other depends only on the distance between the standard and stage mirrors.

SUMMARY OF THE INVENTION

In accordance with the instant invention, I provide a linear displacement interferometer system capable of measuring accurately changes in linear displacement comprising a source of a frequency stabilized input beam with two linear orthogonally polarized components which may or may not be of the same frequency; means for spatially separating the input beam into reference and test beams that are parallel and orthogonally polarized, such as a tilted parallel plate or shear plate with regions of reflection, antireflection, and polarizing coatings; means, most preferably a half-wave phase retardation plate, located in one of the separated beams, for rotating the polarization of the incident beam parallel to the polarization state of the other; means, most preferably a polarizing beamsplitter, two quarter wave phase retardation plates, and a retroreflector, for modifying the polarization and/or direction of the separated beams to be twice incident on different zones of; means, most preferably two plane surfaces, parallel to one another, with reflecting zones for reflecting the reference beam and transparent zones for transmitting the test beam, causing the test beam to be incident upon, means, most preferably two pair of glass wedges, for refracting the test beam to; means, most preferably two plane reflecting surfaces that are parallel to one another; means, most preferably the shear plate, for combining test and reference beams into a single output beam; means, most preferably a polarizer, for mixing the orthogonal components of the output beam; means, most preferably a photoelectric detector, for producing an electrical measurement signal; and means, most preferably a phase meter/accumulator, for indicating the measured phase, the measured phase being related to the linear displacement.

THE DRAWINGS

In the drawings,

FIG. 1 depicts in schematic form the presently preferred embodiment of the present invention; and FIGS. 2A-2C are diagrammatic illustrations of various typical ways for converting the input beam in the embodiment of FIG. 1 into two separated, parallel, orthogonally polarized beams.

DETAILED DESCRIPTION OF THE INVENTION

Figure 1:
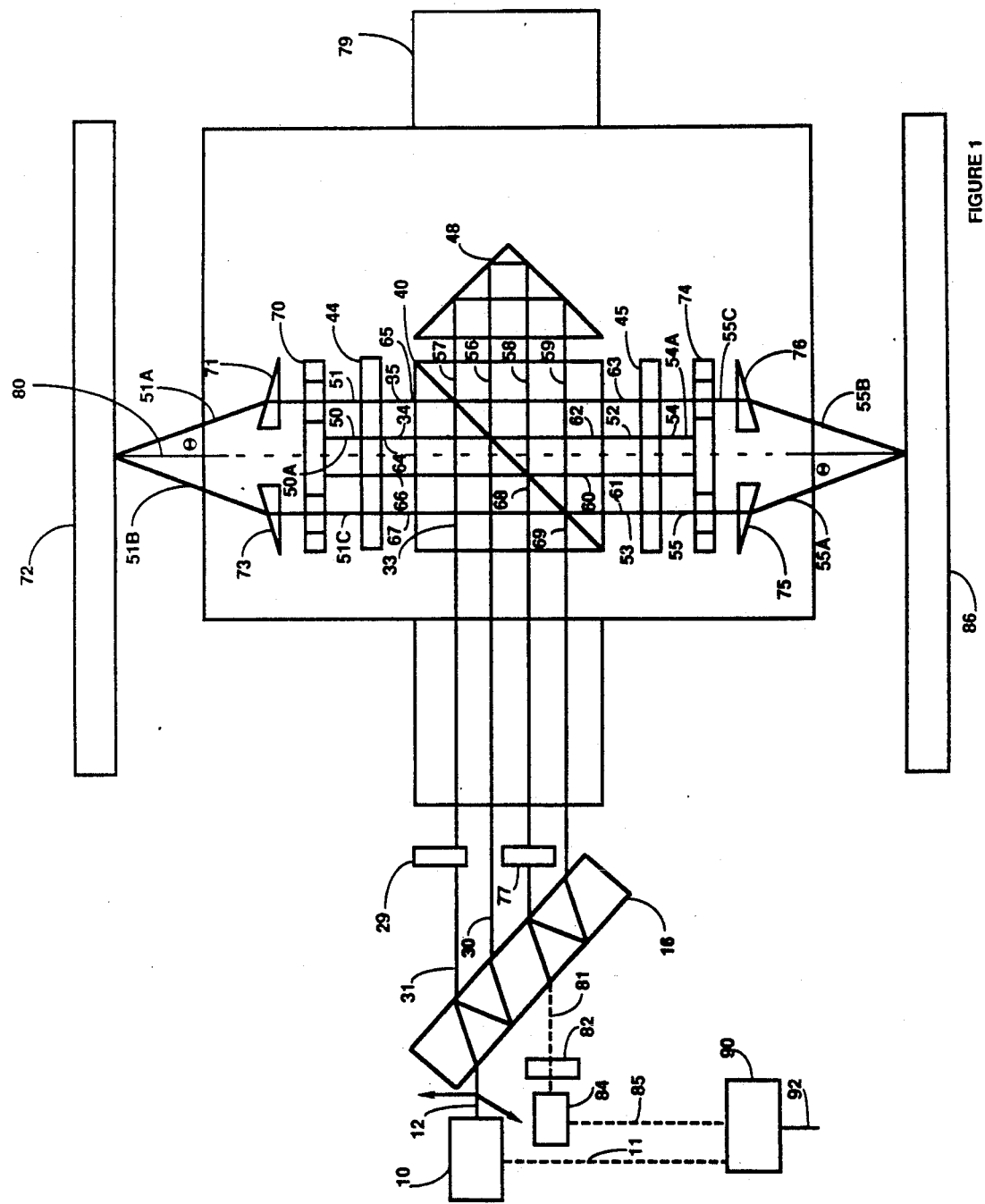

Referring now to the drawings, the detailed description of the invention will relate to the function of the embodiment of FIG. 1 which depicts in schematic form the presently preferred embodiment of the present invention. While the apparatus has application for a wide range of radiation sources, the following description is taken by way of example with respect to an optical measuring system. Light source (10), which most preferably uses a laser, emits an input beam (12) which is frequency stabilized and comprised of two linear orthogonally polarized components as indicated by the two arrows on beam (12), which may, or may not, be of the same optical frequency. If the frequencies are the same, see for example Downs, et al. U.S. Pat. No. 4,360,271, issued Nov. 23, 1982. If the frequencies are different, see for example, Bagley et al. U.S. Pat. No. 3,458,259 issued Jul. 26, 1969 and commonly owned U.S. Pat. No. 4,688,940 issued Aug. 25, 1987, in which instance source (10) would provide an electrical reference signal (11), shown by the dotted lines in FIG. 1, which would correspond to the frequency difference between the two stabilized frequencies. It should be noted that, preferably, no such reference signal (11) is provided when the two orthogonally polarized components comprising input beam (12) are of the same frequency.

Figure 2A:
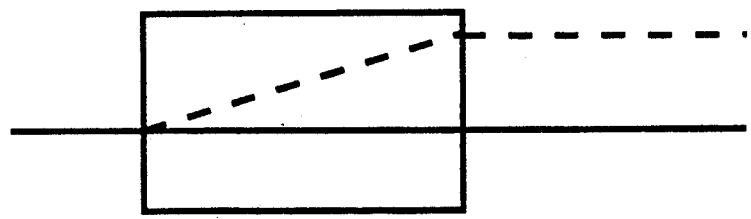
Figure 2B:
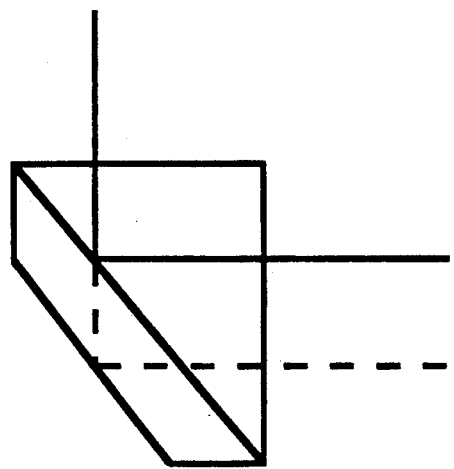
Figure 2C:
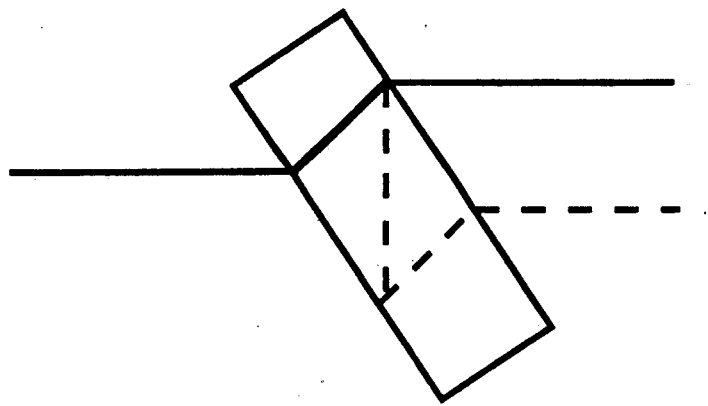

Beam (12) is preferably separated into two parallel, orthogonally polarized beams, by any conventional technique, such as by means using a uniaxial crystal such as calcite which has the property that when properly oriented will angularly deviate one polarization and allow the other to pass undeviated, thereby spatially separating the two, such as shown in FIG. 2A; or by means using a glass prism whose hypotenuse has been coated with a polarizing coating and with a plane parallel plate attached to the hypotenuse, such as shown in FIG. 2B; or by using means, most preferably a shear plate (16), such as shown in FIG. 2C, which is a tilted glass substrate with optically flat surfaces which are mutually parallel. Assuming a tilted parallel plate (16) is used to spatially separate the two polarization components using conventional polarization techniques, such as described in commonly-owned U.S. Pat. No. 4,693,605 issued Sep. 15, 1987, in the embodiment of FIG. 1, beam (12) is preferably divided by tilted parallel plate (16), with the aid of antireflection coatings, a polarizing coating, and a reflective coating, to become vertically polarized beam (31) and horizontally polarized beam (30). Beam (31) then preferably passes through a single half-wave phase retardation plate (29) which rotates the linear polarization of beam (31) by 90° so that resultant beam (33) has the same polarization as beam (30). Beams (30) and (33) enter polarizing beamsplitter (40) and are reflected as beams (34) and (35), respectively.

Beams (34) and (35) pass through quarter-wave phase retardation plate (44) and are preferably converted into circularly polarized beams (50) and (51), respectively. Beam (50) is reflected from a fixed plano mirror, most preferably with two through holes (70), to become beam (50A). Beam (51) preferably passes through a hole in the fixed plano mirror (70) and is refracted by an angle theta by a wedge prism (71) to become beam (51A). An axis of symmetry (80) may be defined that is perpendicular to and intersects the midpoint of the entrance and exit faces of the polarizing beamsplitter (40). A fixed plano mirror (72) is preferably positioned such that it is nominally perpendicular to the axis of symmetry (80) and is located at the intersection of beam (51A) and the axis of symmetry (80). Beam (51A) is reflected by the fixed plano mirror (72) to become beam (51B).

Beam (51B) is refracted by a wedge prism (73) and is rendered parallel to beam (51) to become beam (51C). Beam (51C) passes through a hole in the fixed plano mirror (70). Beams (50A) and (51C) pass back through the quarter-wave phase retardation plate (44) and are converted back into linearly polarized beams that are orthogonally polarized to the original incident beams (34) and (35).

Beams (50A) and (51C) are transmitted by the polarizing beamsplitter (40) to become beams (52) and (53), respectively. Beams (52) and (53) pass through the quarter-wave phase retardation plate (45) and are converted into circularly polarized beams (54) and (55), respectively. Beam (54) is reflected from a fixed plano mirror preferably with two through holes (74) to become beam (54A). Beam (55) passes through a hole in the fixed plano mirror (74) and is refracted by an angle theta by a wedge prism (75) to become beam (55A). A fixed plano mirror (86) is preferably provided parallel to fixed plano mirror (72) and located at the intersection of beam (55A) and the axis of symmetry (80). Beam (55A) is reflected by this fixed plano mirror, called the reference mirror (86), to become beam (55B). Beam (55B) is then preferably refracted by a wedge prism (76) and is rendered parallel to beam (55) to become beam (55C) which preferably passes through the hole in the fixed plano mirror (74). Beams (54A) and (55C) pass back through the quarter-wave phase retardation plate (45) and are preferably converted back into linearly polarized beams that have the same polarization state as the original incident beams (34) and (35). Beams (54A) and (55C) are also preferably reflected by the polarization beamsplitter (40) to become beams (56) and (57). Beams (56) and (57) are preferably reflected by the retroreflector (48) to become beams (58) and (59), respectively. Beams (58) and (59) are preferably reflected by the polarizing beamsplitter (40) to become beams (60) and (61), respectively. Beams (60) and (61) preferably follow a path identical to beams (52) and (53), respectively, to result in beams (62) and (63) in the same manner as beams (52) and (53) preferably result in beams (54A) and (55C). Beams (62) and (63) preferably transmit through the polarizing beamsplitter (40) to become beans (64) and (65).

Beams (64) and (65) preferably follow a path identical to beams (34) and (35), respectively, to result in beams (66) and (67) in the same manner as beams (34) and (35) result in beams (50A) and (51C). Beams (64) and (65) preferably reflect from the polarizing beamsplitter (40) to become beams (68) and (69), respectively.

Beam (68) preferably passes through the half-wave phase retardation plate (77) which rotates the linear polarization of beam (68) by 90° so that resultant beam (68) has a linear polarization which is orthogonal to beam (69). Beams (68) and (69) are preferably combined by the shear plate (16), in the above embodiment, with the aid of an antireflection coating, a polarizing coating, and a reflective coating, each becoming one linearly polarized component of beam (81).

The polarizing beamsplitter (40), quarter wave phase retardation plates (44) and (45), glass wedges (71), (73), (75) and (76), and fixed plano mirrors (70) and (74) are preferably mounted on a platform (78) that is mounted on a linear slide (79). A zero reference position may be chosen at any place along the linear slide (79) between the two mirrors where the optical path difference between the two beams (81) is defined to be zero.

The difference in position may be due to flatness or relative tilt differences between the two mirrors. It should be noted that the beams resulting in beam (68) preferably reflect exclusively from fixed plano mirrors (70) and (74) and the beams resulting in beam (69) preferably reflect exclusively from fixed plano mirrors (72) and (86). A change in flatness in either mirror (72) or (86) will therefore affect only beam (69).

When a difference in position from the zero reference of either mirror surface exists between the two fixed plano mirrors (72) and (86), an optical path difference is introduced between the two polarization components of beam (81). This optical path difference, OPD, is expressed as $$OPD = \frac{4d}{\cosine\theta} \quad (1)$$

where d is the displacement difference between the fixed plano mirrors (72) and (86) and is the deviation angle of the identical glass wedges (71), (73), (75) and (76). This optical path difference results in a phase difference between the two polarization components of beam (81). This phase difference is preferably measured by passing beam (81) through polarizer (82), oriented at 45° to each polarization component, which mixes the two orthogonally polarized components in beam (81) to give beam (83). The interference between the two polarization components is preferably detected by a photodetector (84) producing electrical signal (85). Electronic module or phase meter/accumulator (90) preferably extracts the phase variation from electrical signal (85). When the two polarization components of beam (12) are of the same optical frequency, module (90) does not require reference signal (11), since there is no corresponding frequency difference, and conventionally extracts the phase variation from signal (85) such as in the manner described in aforementioned U.S. Pat. No. 4,360,271. However, when the two polarization components of beam (12) are of different frequencies, an additional sinusoidal electrical reference signal (11) equal in frequency to the difference between the two optical frequencies is required by electronic module (90), which reference signal (11), as previously mentioned, would be provided from source (10), in which instance photodetector (83) would detect the interference between the two frequency components as a sinusoidal intensity variation with a frequency approximately equal to the difference frequency between the two components of beam (12), and module (90) would preferably comprise a phase meter/accumulator, such as described in the aforementioned U.S. Pat. No. 4,688,940, the contents of which are specifically incorporated by reference herein in their entirety. In either event, electronic module (90) provides an output (92) which is directly proportional to the optical path difference given in the above equation.

The output (92) of module (90) is usually in terms of counts, N, which is related to the distance between fixed plano mirrors (72) and (86) by the expression:

$$N = \frac{4d(2^m - 1)}{\lambda \cosine\theta} \quad (2)$$

where $\lambda$ is the wavelength of beam (12) and m is an integer which characterizes the degree to which module (90) can subdivide the wavelength $\lambda$.

Moving the interferometer laterally will not change the overall optical path length of beam (69). This feature allows the system to be insensitive to straightness errors in the linear stage.

The wedge interferometer is temperature sensitive. A change in temperature of the body of the interferometer will cause a change in distance between the fixed plano mirrors (70) and (74). This will cause the system to count since the optical path difference between beams (68) and (69) has changed. The beams resulting in beam (68) reflects from the fixed plano mirrors (70) and (74) the same number of times the beams resulting in beam (69) reflects from the fixed plano mirrors (72) and (86). Ignoring the contribution of the glass wedges (71), (73), (75) and (76), moving either the fixed plano mirrors (70) and (74) or the fixed plano mirrors (72) and (86), results in the same number of counts. Therefore a thermal change in internal mirror position adds directly to the mirror flatness error.

With the exception of the glass wedges (71), (73), (75) and (76), thermal changes in the refractive index of glass will not cause the interferometer to count. This is because in the space between the fixed plano mirrors (70) and (74), both beams resulting in beam (81) travel through the same amounts and types of glass.

Some of the advantages of the present invention are (1) high resolution, i.e., 1.25 nanometer by way of example, (2) insensitivity to linear stage translation errors, (3) elimination of ambiguities concerning the location of features of interest on mirror surfaces and (4) the measurement is based on the wavelength of light.

While a preferred embodiment of the invention has been disclosed, obviously modification can be made therein, without departing from the scope of the invention as defined in the following claims.

What is claimed is:

1. A linear displacement interferometer system for accurately measuring changes in linear displacement for determining the flatness of or angle between a pair of mirrored surfaces, said interferometer having an optical axis and an axis of symmetry and comprising:

a source of a frequency stabilized input beam having two linear orthogonally polarized components;

means optically associated with said input beam for spatially separating said input beam into a reference beam and a test beam, said reference beam and said test beam each having an associated wavelength and direction and being parallel and orthogonally polarized;

means located in one of said spatially separated beams for rotating the polarization of the beam incident thereto parallel to the polarization state of the other of said spatially separated beams;

means for modifying the polarization and/or direction of said separated beams, said modifying means having an entrance face and an exit face;

wedge prism means disposed about said interferometer axis of symmetry for refracting said test beam at a predetermined deviation angle to said optical axis for forming a spot on each of said pair of mirrored surfaces, said interferometer axis of symmetry being normal to and intersecting the midpoint of said entrance and exit faces; and stage mirror means and reference mirror means disposed along said interferometer axis of symmetry where said refracted beam crosses said interferometer axis of symmetry, said stage mirror means and said reference mirror means each comprising one of said pair of mirrored surfaces, said refracting means and said modifying means being disposed between said mirrored surfaces, said sport formed by said refracting means comprising a single area approximately the size of said test beam; whereby any ambiguity concerning the refracted beams is eliminated.

2. A linear displacement interferometer system in accordance with claim 1 wherein said input beam source comprising a laser.

3. A linear displacement interferometer in accordance with claim 2 wherein said linear orthogonally polarized components of said input beam each have an associated optical frequency, said associated optical frequencies being the same.

4. A linear displacement interferometer system in accordance with claim 2 wherein said linear orthogonally polarized components of said input beam are of different optical frequencies.

5. A linear displacement interferometer system in accordance with claim 1 wherein said linear orthogonally polarized components of said input beam are of the same optical frequency.

6. A linear displacement interferometer system in accordance with claim 1 wherein said linear orthogonally polarized components cf said input beam are of different optical frequencies.

7. A linear displacement interferometer system in accordance with claim 1 wherein said means for spatially separating said input beam comprises a shear plate.

8. A linear displacement interferometer system in accordance with claim 7 where said shear plate comprises a tilted glass substrate with optically flat surfaces which are mutually parallel and with regions of reflection, antireflection, and polarizing coatings.

9. A linear displacement interferometer system in accordance with claim 8 wherein said input beam source comprises a laser.

10. A linear displacement interferometer system in accordance with claim 1 wherein said means for spatially separating, said input beam comprises a glass prism.

11. A linear displacement interferometer system in accordance with claim 10 wherein said prism comprises a hypotenuse coated with a polarizing coating and a plane parallel plate attached to said hypotenuse.

12. A linear displacement interferometer system in accordance with claim 11 wherein said input beam source comprises a laser.

13. A linear displacement interferometer system in accordance with claim 10 wherein said input beam source comprises a laser.

14. A linear-displacement interferometer system in accordance with claim 1 wherein said means for spatially separating said input beam comprises a uniaxial crystal oriented to angularly deviate one polarization and allow the other to pass undeviated.

15. A linear displacement interferometer system in accordance with claim 14 wherein said uniaxial crystal comprises calcite.

16. A linear displacement interferometer system in accordance with claim 15 wherein said input beam source comprises a laser.

17. A linear displacement interferometer system in accordance with claim 14 wherein said input beam source comprises a laser.

18. A linear displacement interferometer system in accordance with claim 1 wherein said means located in one of said spatially separated beams for rotating the polarization comprises a half-wave phase retardation plate.

19. A linear displacement interferometer system in accordance with claim 18 wherein said means for spatially separating said input beam comprises a shear plate.

20. A linear displacement interferometer system in accordance with claim 19 wherein said input beam source comprises a laser.

21. A linear displacement interferometer system in accordance with claim 1 wherein said modifying means comprises a polarizing beamsplitter.

22. A linear displacement interferometer system in accordance with claim 21 wherein said modifying means further comprises a retroreflector and quarter wave phase retardation plates.

23. A linear displacement interferometer system in accordance with claim 22 wherein said input beam source comprises a laser.

24. A linear displacement interferometer system in accordance with claim 21 wherein said input beam source comprises a laser.

25. A linear displacement interferometer system in accordance with claim 1 wherein said wedge prism means comprises a pair of wedge prisms disposed about said axis of symmetry.

26. A linear displacement interferometer system in accordance with claim 25 wherein said modifying means comprises a polarizing beamsplitter.

27. A linear displacement interferometer system in accordance with claim 26 wherein said axis of symmetry is normal to and intersects the midpoint of the entrance and exit faces of said polarizing beamsplitter.

28. A linear displacement interferometer system in accordance with claim 27 wherein said input beam source comprises a laser.

29. A linear displacement interferometer system in accordance with claim 1 wherein said system further comprises:

means optically associated with said modifying means for causing said test beam to be incident upon said wedge prism means, said incident beam causing means comprising a reflecting zone for reflecting said reference beam and a transparent zone for transmitting said test beam; said modifying means comprising means for modifying said polarization and/or direction of said separated beams to be twice incident on different zones of said means optically associated with said modifying means;

means for combining said test and reference beams into a single resultant output beam; and means for measuring a phase difference between the two polarization components of said resultant output beam; said stage mirror means and said reference mirror means comprising plano mirrors; said phase difference being indicative of an optical path difference introduced between said two polarization components of said resultant output beam due to linear displacement of said fixed plano mirrors; said optical path difference being defined by the expression $$OPD = \frac{4d}{\text{cosine}\theta},$$

where d represents the linear displacement difference between said plano mirrors and $\theta$ represents said deviation angle of said wedge prism means; whereby said measured linear displacement is directly proportional to said measured phase difference for accurately measuring changes in said linear displacement.

30. A linear displacement interferometer system in accordance with claim 29 wherein said incident beam causing means comprises a pair of plane surface, parallel to one another having said reflecting zones and said transparent zones.

31. A linear displacement interferometer system in accordance with claim 29 wherein said combining means comprises a shear plate, said shear plate further comprising said means for spatially separating said input beam.

32. A linear displacement interferometer system in accordance with claim 31 wherein said input beam source comprises a laser.

33. A linear displacement interferometer system in accordance with claim 29 wherein said combining means comprises a shear plate.

34. A linear displacement interferometer system in accordance with claim 33 wherein said input beam source comprises a laser.

35. A linear displacement interferometer system in accordance with claim 29 wherein said phase difference measuring means comprises means for providing an output which is directly proportional to said optical path difference.

36. A linear displacement interferometer system in accordance with claim 35 wherein said phase difference measuring means comprises means for providing a count N related to the distance between said plano mirrors in accordance with the expression:

$$N = \frac{4d(2^m - 1)}{\lambda \text{cosine}\theta}$$

where $\lambda$ is the wavelength of the beam and m is an integer which characterizes the degree to which said wavelength can be subdivided by said count providing means.

* * * * *